United States Patent [19]

Bowen et al.

[11] Patent Number: 5,004,617
[45] Date of Patent: Apr. 2, 1991

[54] METHOD OF HEATING FOOD

[75] Inventors: Robert F. Bowen, Burlington; Kenneth W. Dudley, Sudbury; Joseph C. Maiellano, Jr., Chelmsford, all of Mass.

[73] Assignee: Raytheon Company, Lexington, Mass.

[21] Appl. No.: 448,408

[22] Filed: Jan. 11, 1990

Related U.S. Application Data

[62] Division of Ser. No. 197,716, May 23, 1988, Pat. No. 4,917,006.

[51] Int. Cl.$^5$ .............................................. A23L 1/00
[52] U.S. Cl. .................................... 426/233; 426/523
[58] Field of Search ....................... 426/233, 520, 523; 99/331, 385, 400, 446; 219/512; 126/339 G

[56] References Cited

U.S. PATENT DOCUMENTS

| | | | |
|---|---|---|---|
| 4,373,431 | 2/1983 | Wallick et al. | 426/520 |
| 4,749,582 | 6/1988 | Wardell | 426/523 |

*Primary Examiner*—George Yeung
*Attorney, Agent, or Firm*—William R. Clark; Richard M. Sharkansky

[57] ABSTRACT

An expansion thermostat adapted for regulating the temperature of a cooking surface. One end of the cooking surface is secured at one end of a container. Mounted to the other end of the container is a switch which controls the heat. When the cooking surface is heated, the cooking surface expands causing the other end of the cooking surface to release the switch. Releasing the switch turns off heat to the cooking surface. As the cooking surface cools, the switch is pressed. Pressing the switch turns on heat to the cooking surface. The heat to the cooking surface is thus cycled to provide a substantially constant cooking temperature.

4 Claims, 6 Drawing Sheets

METHOD OF HEATING FOOD

This application is a divisional of application Ser. No. 197,716, filed May 23, 1988 now U.S. Pat. No. 4,917,006.

BACKGROUND OF THE INVENTION

The invention generally relates to cooking food on a grill or griddle, and more particularly relates to controlling the temperature of such apparatus.

It is well known that it is desirable to be able to control the heat supplied to a grill or griddle. Accordingly, a control knob is typically provided to adjust the heat source. For example, whether cooking with gas or electricity, the control knob generally will adjust the heat source output from low to high through intermediate graduations. When the cook wants a higher temperature, the control knob is used to turn up the heat. When the cook wants a lower temperature, the control knob is used to turn down the heat.

Adjusting the heating source temperature presents problems. First, the cook knows what temperature he wants the grill to be. However, it is not enough merely to set the heat source output level to attain that temperature because for a given heat output (in BTUS), the temperature of the grill varies as a function of the food load. Accordingly, the cook has to monitor the temperature rather than just set the heat source output level on the heat source control knob.

Second, with an electric heating element, the heat output level for a given control setting can vary as a function of line voltage. Accordingly, the temperature cannot be set by setting the position of a heat source control knob.

A third problem with controlling heat source output rather than temperature is that if the heat output is anything other than high, the heat source operates at a reduced power level while it is warming up to temperature. Operating at reduced power level of course increases the grill or griddle warm up time.

Problems with manually adjusting the heat source can be overcome by regulating the temperature. The device commonly used in temperature regulation is a thermostat. Typically, a thermostat is constructed by attaching a thermocouple (or bimetallic switch) to a location normally on one end of the grill and connecting a wire from the thermostat to an on/off switch within the control knob. When the temperature of the location of the grill where the thermocouple is located reaches a preset point, a sensor within the control knob shuts off the grill. When the grill cools to a second preset point, the thermocouple signals to the sensor to turn on the heat.

Using a thermocouple for temperature regulation presents problems in grill or griddle cook tops. Often the temperature of the grill or griddle is uneven. One location of the grill or griddle may be hotter than another. If the thermocouple is in the hot location, the grill or griddle will not be set to the right temperature. When food is placed on the grill or griddle, the food will cool the location where it is placed. If the food is placed directly over a thermocouple, the average temperature over the grill could become too hot. If the food is placed on a location not near a thermocouple, the average temperature over the grill may remain too cold.

The problem of using a thermostat for regulating the grill temperature is most apparent during the initial heating cycle. When a grill is heated, the response of a thermocouple mounted at the long end of a grill is slow.

SUMMARY OF THE INVENTION

An object of this invention is to provide an improved method for regulating the temperature of a heating surface.

Another object of this invention is to provide a method for regulating the temperature of a food cooking surface having hot and cold spots.

It is also an object of this invention to provide an automatic method of maintaining a stable temperature of a heating surface.

Another object of this invention is to provide a method for regulating the temperature of a food cooking surface with a heat source output level that varies as a function of line voltage.

An additional object of this invention is to provide a faster method of responding to the changes in temperature of the cooking surface due to food load.

A further object of this invention is to provide a quicker method of heating the grill to a desired cooking temperature.

These and other objects are provided in accordance with the invention which defines a cooking apparatus comprising a grill for supporting food to be cooked, a heat source on the grill for cooking the food, and means responsive to the expansion of the grill for controlling the heat source. It may be preferable that the heat source of the cooking apparatus is an electrically resistive coil. Preferably, the grill of the cooking apparatus is comprised of a metal material.

The invention may be further practiced by a method of regulating the temperature of a grill for supporting food to be cooked, having an opposing first and second end comprising the steps of applying heat to the grill and lowering the temperature of the heat applied to the grill in response to the second side expanding to a predetermined distance away from the first end. It may be preferable that the method of regulating the temperature of a grill further comprise the step of raising the temperature of the heat applied to the grill in response to the second end contracting a predetermined distance inward to the first end. Also, the method of regulating the temperature of a grill may further comprise the step of supporting the grill in an elevated, horizontal position.

BRIEF DESCRIPTION OF THE DRAWINGS

The foregoing objects and advantages will be more fully understood by reading the Description of the Preferred Embodiments with reference to the drawings wherein.

DESCRIPTION OF THE PREFERRED EMBODIMENTS

Figure 1:
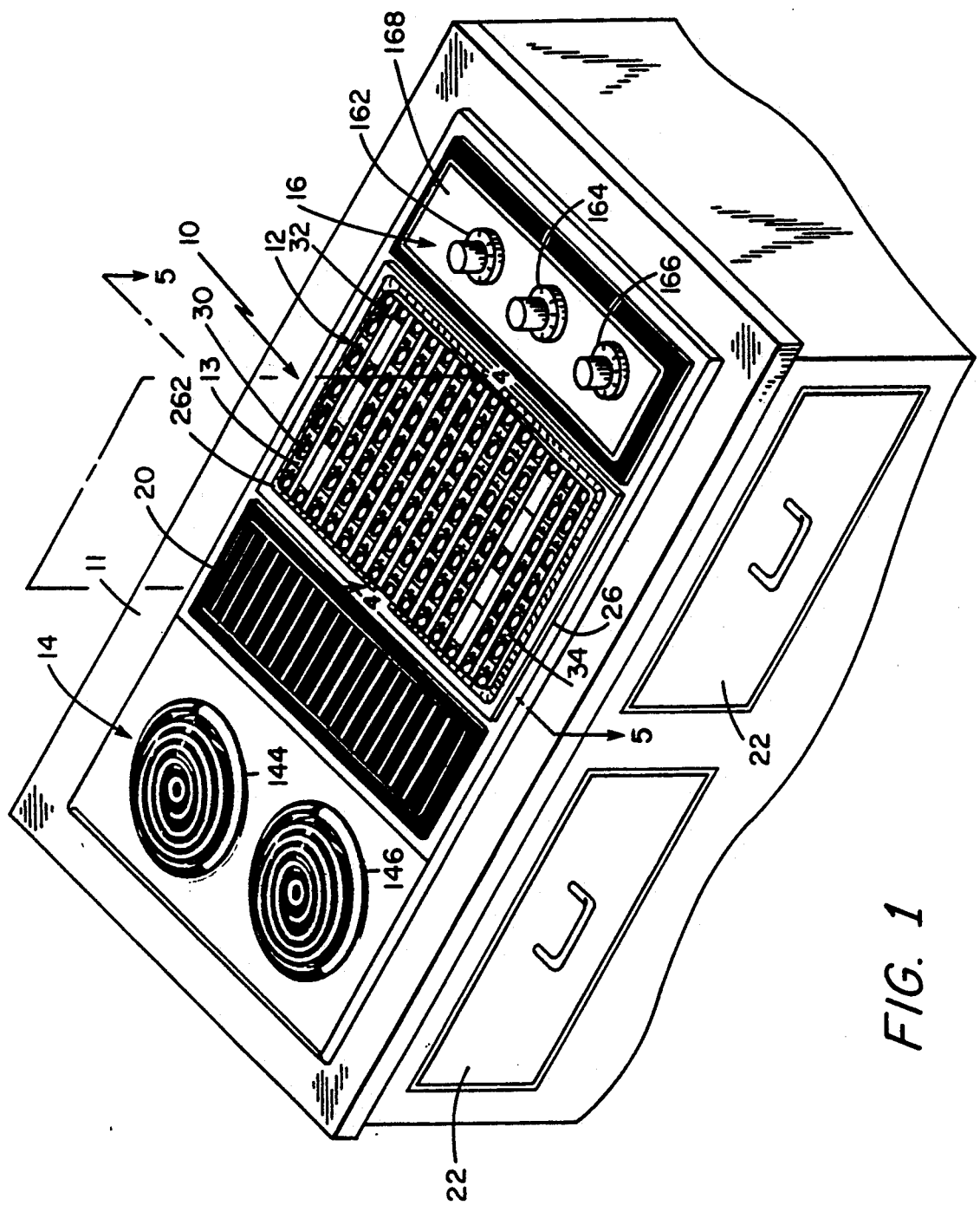
FIG. 1 is a perspective view of the grill in a countertop configuration.

Referring to FIG. 1, there is shown a top perspective view of surface cooking unit 10 mounted in counter 11. Surface cooking unit 10 contains a stove top heating unit 14, a vent 20, a control section 16 and a broiling unit 12. The stove top heating unit 14 contains stove top heating elements 144 and 146 which are used to heat food in a pot or a frying pan (not shown). Vent 20 is used to remove any smoke or moisture that is generated from cooking on stove top heating elements 144 and 146 or broiling unit 12.

Control section 16 includes control knob 162 that controls broiling unit 12, and heat control knobs 164 and 166 that respectively control stove top heating elements 144 and 146. Control section 16 is part of control module 168 which regulates the electricity going to stove top heating elements 144, 146 and broiling unit 12. Both broiling unit 12 and stove top heating unit 14 are modular and can be removed.

Beneath counter 11 are drawers 22 that can be used to store utensils or other cooking equipment. Also positioned below counter 11 is a down draft ventilation system (not shown) which is connected to vent 20 for drawing smoke downwardly.

Figure 2:
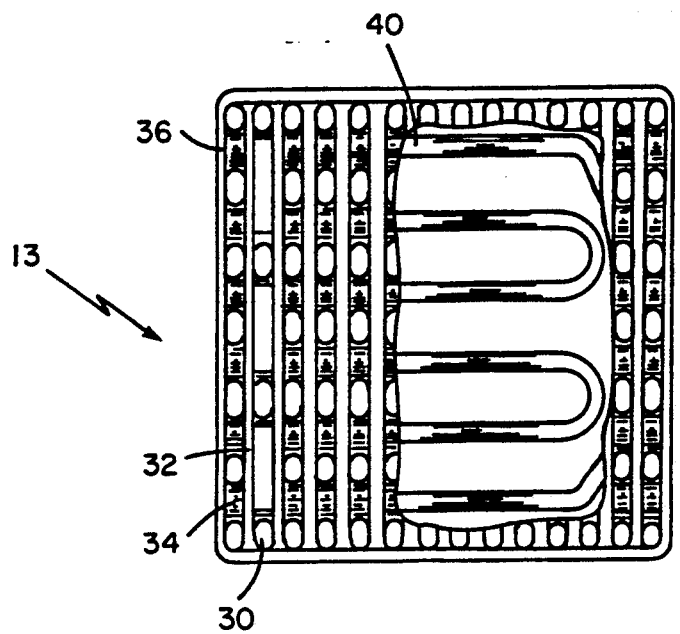
FIG. 2 is a top view of the grill.
Figure 4:
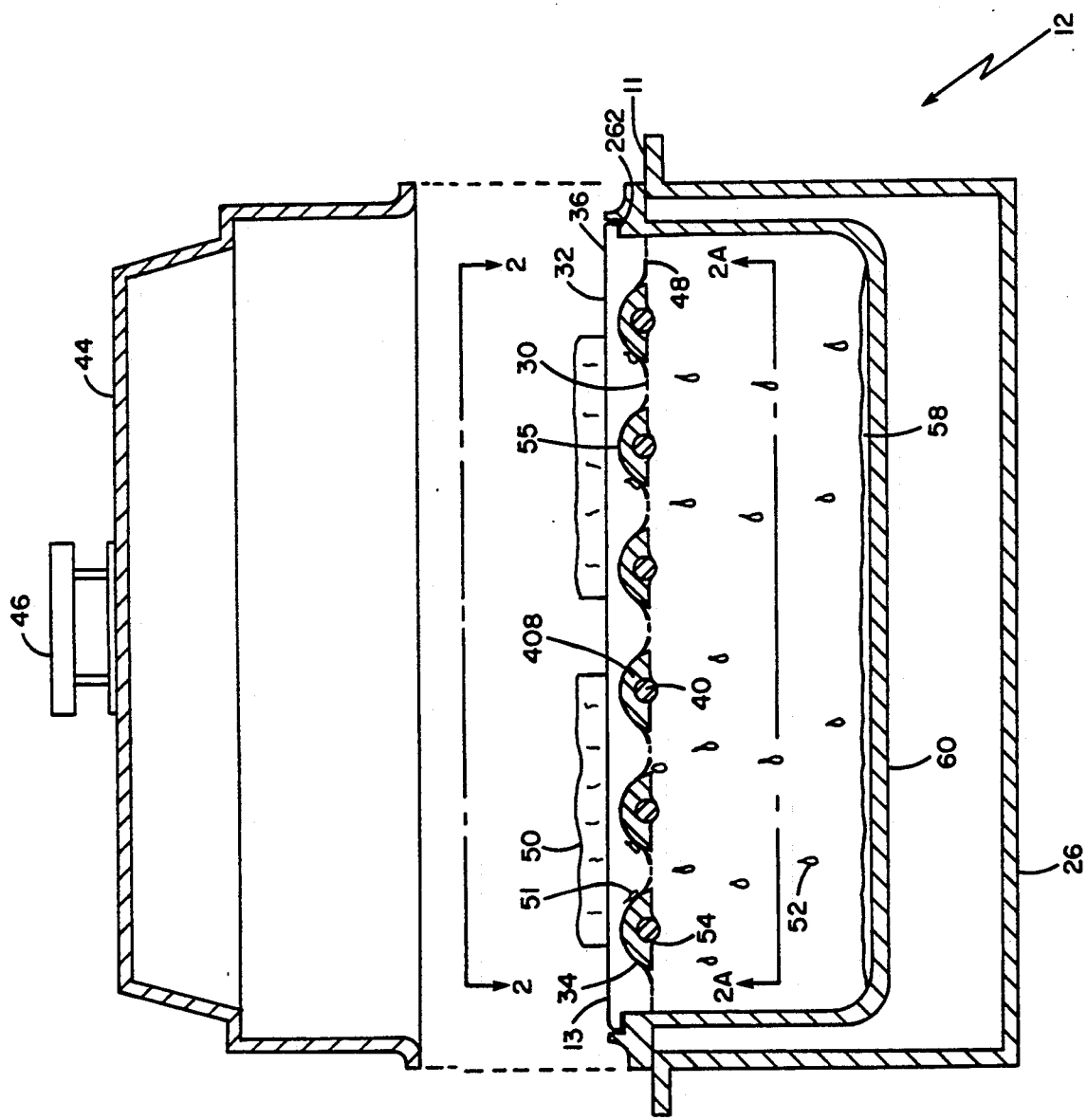
FIG. 4 is a side sectioned view of the grill supported by a grease pan, as shown in FIG. 1 along Section 4—4 further including a cover.

Referring to FIGS. 2 and 4, there are shown a top and side view of a broiling unit 12. The broiling unit 2 includes a grill 13, heating element 40, and grease pan 60 mounted in grill supporter 26 (FIG. 4).

Grill 13 has a lower surface 48 (FIG. 3) and an upper surface 36 (FIG. 2). The grill 13 is comprised of charring ridge 32, channeling ridge 34, and apertures 30. Charring ridge 32 is used to support food 50 (FIG. 4). In addition, charring ridge 32 puts charring marks on food 50 which it supports. Positioned below charring ridge 32 is groove or channeling ridge 34. Channeling ridge 34 provides channels into which juices or drippings 51 from food 50 can run. Positioned between channeling ridge 34 and charring ridge 32 are apertures 30. Alternately, apertures may be positioned in charring ridge 32.

Apertures 30 are shown scattered throughout the grill 13 in evenly spaced rows and columns. Apertures 30 provide openings through which drippings 52 from food 50 may be removed. Details of this removal process will be explained in more detail further herein.

Referring to FIG. 1 and FIG. 4, grill supporter 26 is embedded into counter 11. Grill supporter 26 has ridges 262 along the top sides to hold grill 13 in a substantially horizontal plane. Referring to FIG. 4, grease pan 60 is between grill supporter 26 and grill 13. Grease pan 60 and grill 13 are removable for cleaning.

Figure 3:
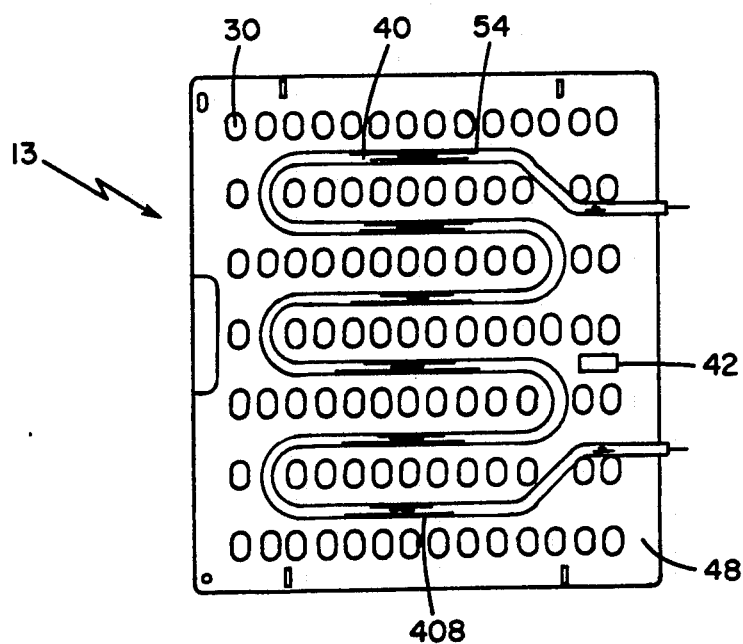
FIG. 3 is a bottom view of the grill.

Referring to FIG. 3 and FIG. 4, attached to lower surface 48 is lip 54, grill actuator 42 (FIG. 3), and heating element 40. Disposed between the apertures 30 in a snake-like pattern on lower surface 48 is a groove 408. Heating element 40 is connected to grill 13 in groove 408. Heating element 40 thermally communicates with grill 13. This heating element 40 is electrically resistive and becomes very hot, approximately 500° F., when electrical current is passed through it. Through conduction, heating element 40 causes grill 13 to become hot.

Attached to grill 13 lower surface 48 is lip 54. Lip 54 surrounds electrically resistive heating element 40 and secures electrically resistive heating element 40 in place. Lip 54 has slits 55 on its inner surface to prevent warping of grill 13 when heating element, 40 is heated.

Grill actuator 42 is attached to the front portion of lower surface 48. Grill actuator 42 is used for the temperature regulation of grill 13. The details of the use of grill actuator 42 will be explained later (see FIG. 5 and FIG. 6).

Referring to FIG. 4, shown is broiling unit 12 over which is cover 44. Cover 44 resides over upper surface 36. Cover 44 is used to contain heat generated by the broiling unit 12. Typically cover 44 is used when cooking poultry. The cover 44 allows heat to be distributed more evenly to the poultry. Cover 44 is made of a stainless steel material Connected to the top of cover 44 is wooden handle 46 to allow ease in removal of cover 44.

Figure 6:
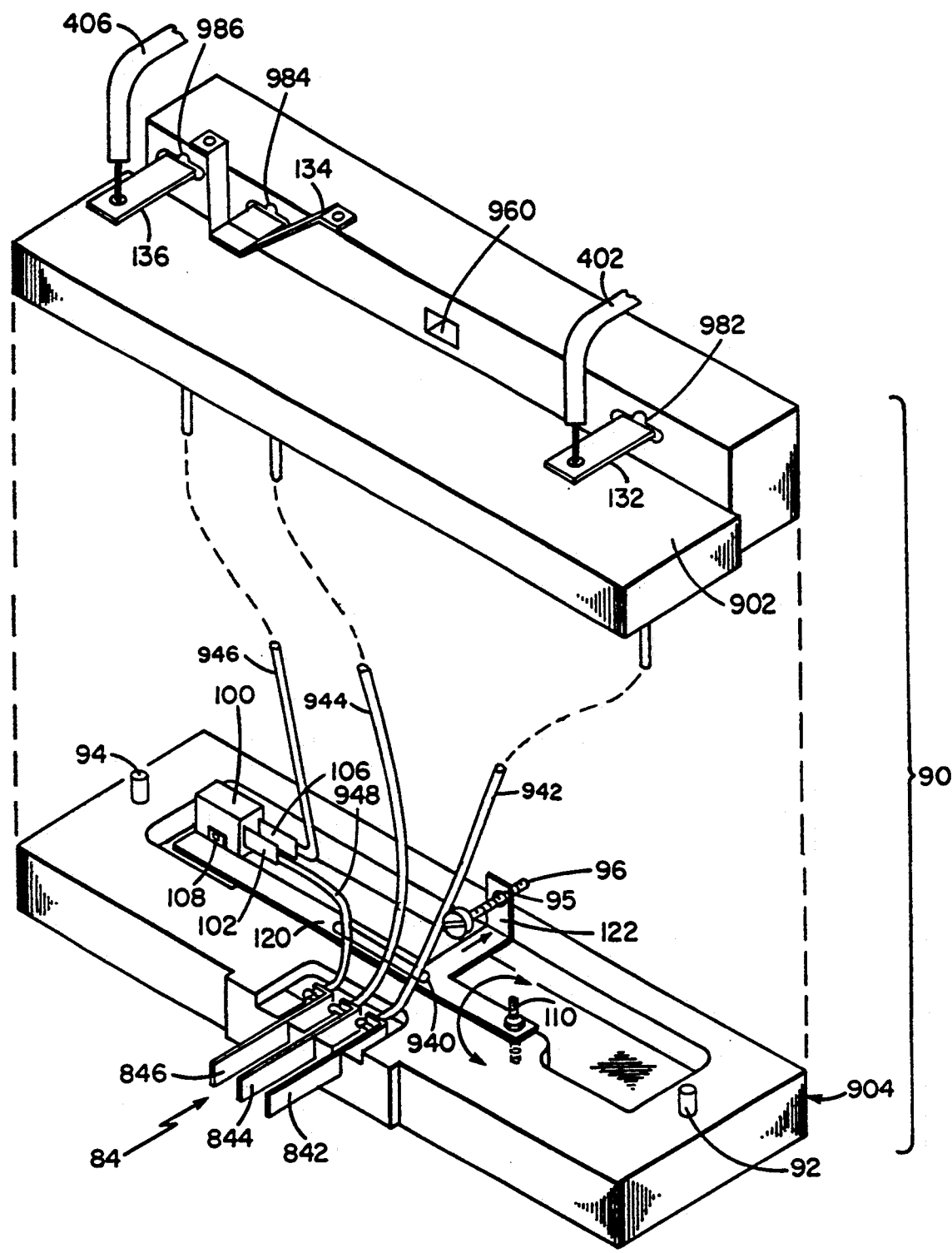
FIG. 6 is an exploded view of the thermostat block shown in FIG. 5.

The grill 13 shown in FIG. 4 contains the heating element 40 connected directly to electric plugs 842 and 846 (FIG. 6). Electric plug 844 is wired directly to grill 13 through bracket 134. Electric plugs 842, 844 and 846 are connected to control module 168 (FIG. 1). Electric plug 844 is connected to ground through control module 168. Electricity to heating element 40 is provided through control module 168. Control module 168 pulses electricity to heating element 40. The duration of electric pulses provided to heating element 40 is regulated by turning control knob 162 (FIG. 1). Control knob 162 has a variety of settings corresponding to the approximate final temperature of heating element 40. The higher heating temperatures correspond to higher settings on knob 162.

Low-Smoke Broiling Unit Operation

Referring to FIG. 1 and FIG. 4, broiling unit 12 is operated by turning control knob 162 to a selected temperature setting. Pulsed electric current is then passed through control module 168 to electrically resistive heating element 40. This heating element 40 becomes hot and heats grill 13. Grill 13 is made out of aluminum or another type of metal, which conducts heat to meat or food 50. The temperature of grill 13 is then raised to 200°-500° F. corresponding to the setting of control knob 162.

Heating grill 13 causes food 50, which rests on charring ridge 32, to become hot. Drippings or juice 51 then flows from food 50 into channeling ridge 34. Due to the curvature of channeling ridge 34, drippings 51 then flow downwardly and out apertures 30. Drippings 52 then drain from apertures 30 onto grease pan 60 where they are collected. Drippings 58 are removed by cleaning grease pan 60 at the completion of cooking.

Grill 13 provides an advantage over prior art conventional grills. Conventional grills are constructed with evenly spaced bars. Further, a heating source is positioned directly below the grill. The heat source heats up to a temperature of approximately 1200-1500° F. When food is placed on the grill surface and heated, drippings flow from the food and downward through spaces between the bars. After falling through the spaces, the drippings contact the heat source which results in smoke and flare ups. When using grill 13 to cook food, the drippings 52 do not directly contact heating element 40. Also with grill 13, the food 50 is placed directly on the grill 13 top surface. Because the food 50 is cooked on grill 13 by direct conduction rather than radiation, the heating element temperature will cook food 50 at temperatures below 500° F. and drippings 51 contacting grill 13 produce very little, if any, smoke.

Figure 4A:
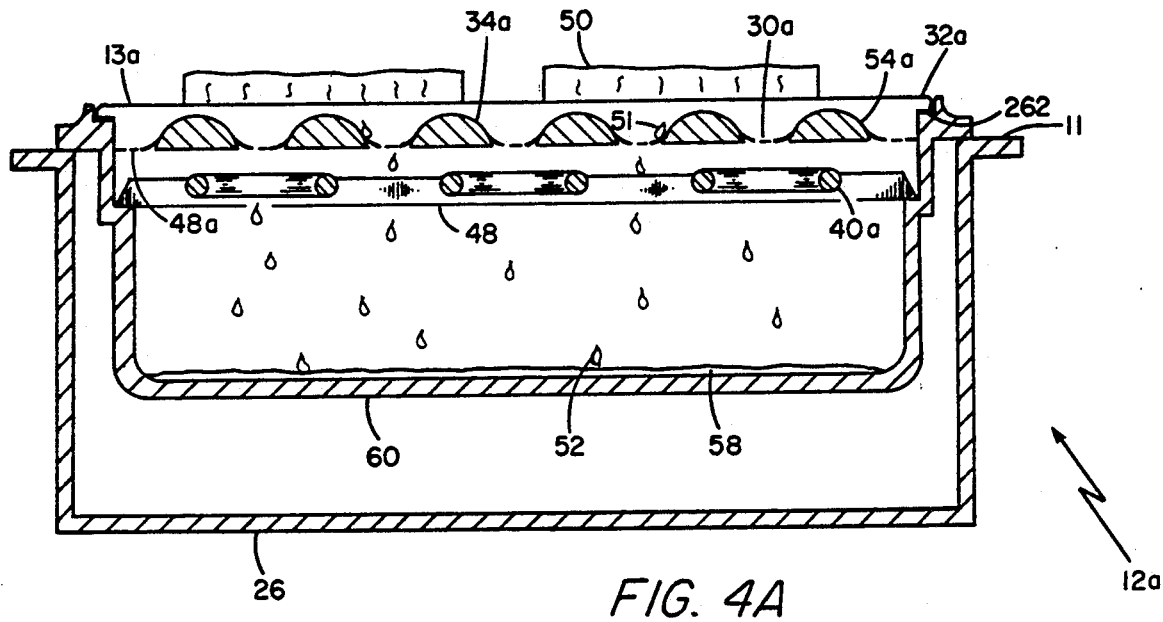
FIG. 4A is a side sectioned view of an alternate embodiment of the grill with heating elements not attached to the grill.

Referring to FIG. 4A, shown is a side view of broiling unit 12a, an alternate embodiment of the broiling unit 12 shown in FIG. 4. This alternate embodiment of the broiling unit 12a has the same elements of the preferred embodiment of the broiling unit 12, with the exception that heating element 40a is not connected to grill 13a. Further, channeling ridge 34a does not contain a groove 408 and is flat on its lower surface 48a. In this embodiment, heating element 40a is mounted in a horizontal plane approximately 1 inch below grill 12a and is positioned substantially between apertures 30a. Here, the heating element 40a is shown as an electric resistive element; however, a blue flame side ported tubular burner for gas cooking or other equivalent heating devices could be used. Charring ridge 32a is located directly over heating element 40a.

To heat the food 50 on the grill 13a shown in FIG. 4A heating element 40a is raised to approximately 1300° F. The food 50 is then heated through the convection and radiation of heating element 40a. When food 50 is heated, drippings 51 drain from the grill 13a through apertures 30a. Due to the positioning of apertures 30a between the coils of heating element 40a, falling drippings 52 avoid contacting electrical resistive heating element 40a, thereby preventing smoke. These drippings 52 then fall into and are collected in grease pan 60.

Figure 4B:
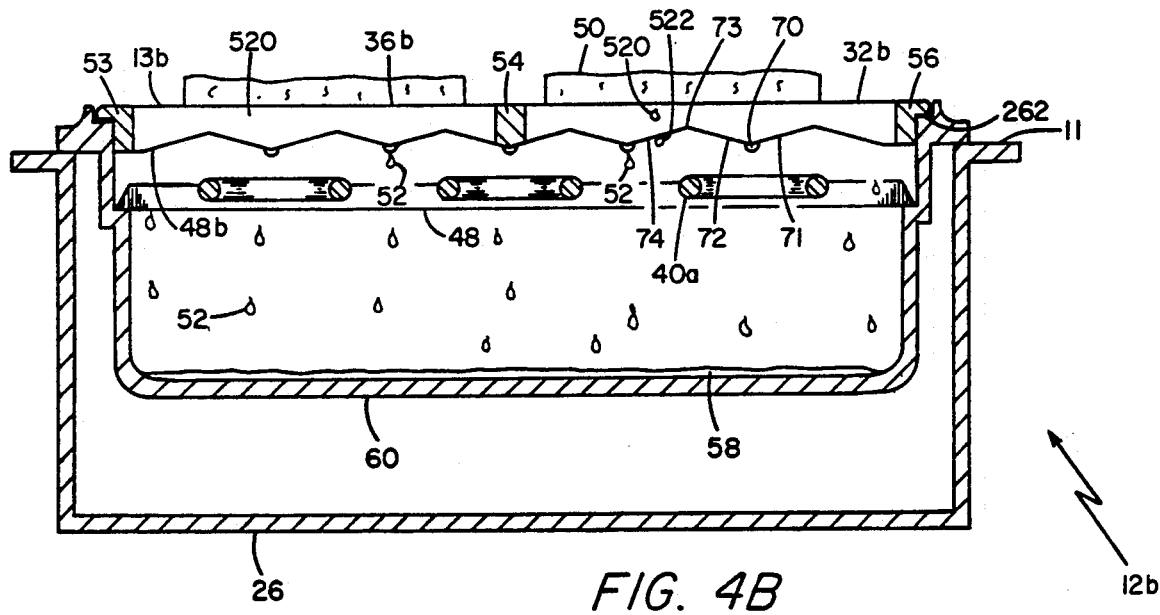
FIG. 4B is a side sectioned of an alternate embodiment of the grill with ramps connected to the bottom of the charring ridges.

Referring to FIG. 4B, broiling unit 12b is an alternate embodiment of the broiling unit 12a. Grill 13b contains three supporting cross bars 53, 54 and 56. Attached perpendicular to cross bars 53, 54 and 56 are a plurality of parallel and evenly spaced charring ridges 32b. Between the charring ridge 32b and the cross bars 53, 54 and 56 are holes (not shown). The bottom of the charring ridges 32b is shaped to form a series of ramps 71, 72 and 74 in a sawtooth pattern. The lowest point or nadir formed by ramps 71 and 72 is positioned between the coils of heating element 40a. Attached to the nadir of charring ridge 32b between ramps 71 and 72 is downward protrusion 70. The peak 73 or highest point formed by ramps 72 and 74 is located above heating element 40a between right ramp 72 and left ramp 74.

During operation of the embodiment shown in FIG. 4B, drippings 520 from meat 50 flow downward to the top surface 36b and then to bottom surface 48b of charring ridge 32b. Due to the slope of the left ramp 74 and right ramp 72, the drippings 522 then flow down right ramp 72 or left ramp 74 onto protrusion 70. The drippings 52 then fall from protrusion 70 onto grease pan 60. These fallen drippings 58 are then collected on grease pan 60. The drippings 52 fall between the coils of heating element 40a. Because the drippings 52 do not contact heating element 40a, smoke is reduced.

Figure 5:
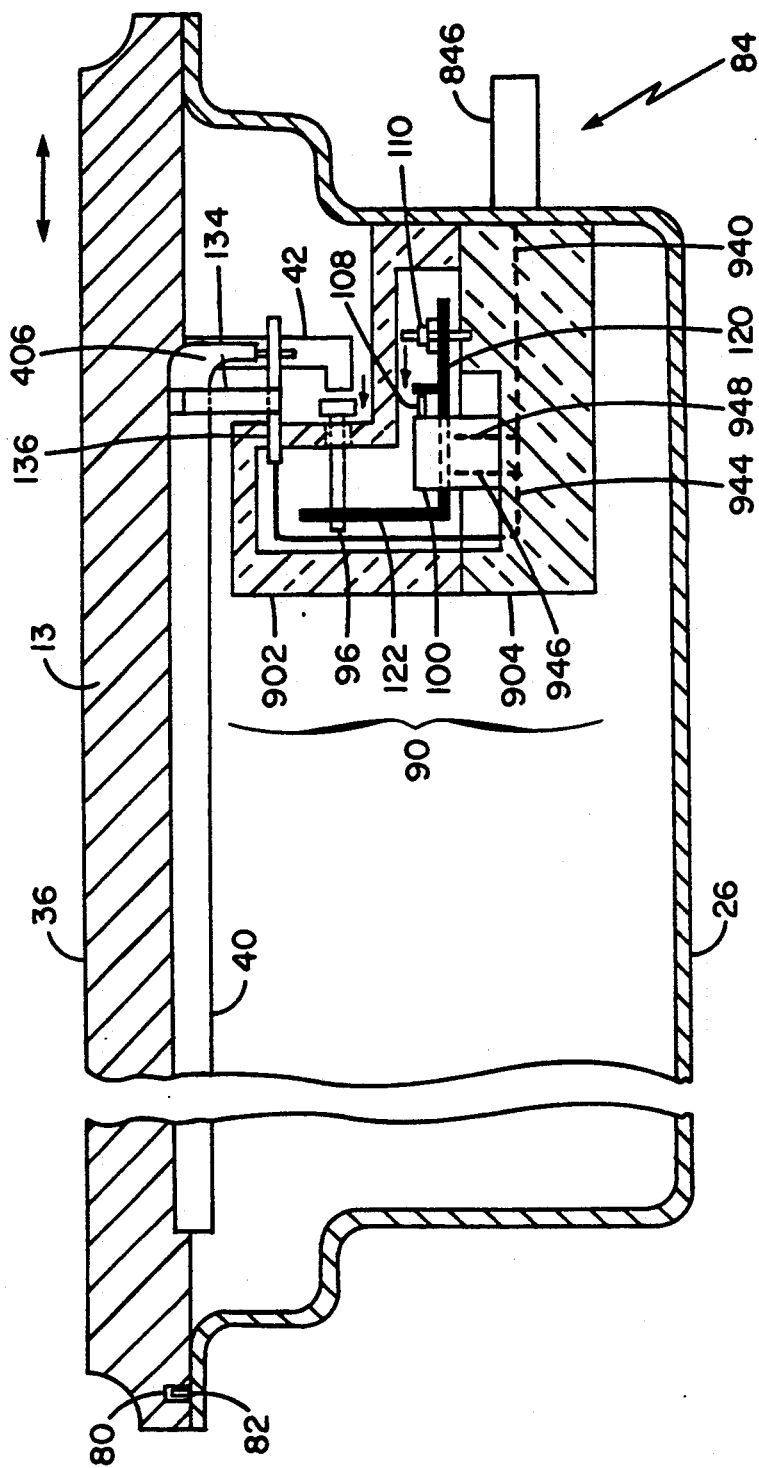
FIG. 5 is a side sectioned view of a grill connected to a thermostat block, as shown in FIG. 1 along Section 5—5.

Referring to FIG. 5, block 90 is shown in a view taken along line 5—5 of FIG. 1. The thermostat block 90 is used to regulate the temperature of grill 13. It is preferable that the thermostat block 90 be operated using an aluminum grill 13 or griddle because aluminum has one of the highest coefficients of expansion of common metal and aluminum also has a high thermoconductivity. The thermostat block 90 will work with other metal surfaces. Sticking out the back side of thermostat block 90 through broiling unit are electric plugs 84. Electric plugs 84 are connected directly into control module 168 (FIG. 1).

In this embodiment, grill 13 is not supported in a ridge 262 (FIG. 4). However, the grill 13 rests on top of grill supporter 26a and is held in place with placement pins 82 integrally attached to the back corners of grill supporter 26a. The back portion of grill 13 contains holes 80 in which placement pins 82 are inserted. Alternately, pin 82 may be mounted on a horizontally adjustable cam or lever (not shown) within grill supporter 26a. The adjustable cam would then be adjusted to change the location of pin 82 and hole 80.

When the thermostat block 90 is used, the control knob 162 (FIG. 1) on control section 16 (FIG. 1) has an on/off position. When control knob 162 is turned to the "on" position, control module 168 (FIG. 1) causes non-regulated 115V AC electricity to be passed to heating element 40 through thermostat block 90. When control knob 162 is turned to the "off" position, control module 168 causes non-regulated 115V AC electricity to be disconnected from heating element 40.

Referring now to FIG. 6, shown is an exploded view of thermostat block 90 shown in FIG. 5. Thermostat block 90 contains a bottom thermostat block 904 connected under a top thermostat block 902. Pin 94 and pin 92 hold together bottom thermostat block 904 and top thermostat block 902.

Mounted on bottom thermostat block 904 is pivot 110, AC plugs 84, and microswitch 100. Connected to pivot 110 slightly above the top surface of bottom thermostat block 904 is pivot arm 120. Touching one end of pivot arm 120, connected to microswitch 100 is button 108. At the other end of pivot arm 120 is pivot 110. Integrally connected to pivot arm 120 between pivot 110 and button 108 is angle bracket 122. Angle bracket 122 contains a hole 95 for mounting capture screw 96. When top thermostat block 902 is connected to bottom thermostat block 904, capture screw 96 protrudes through a hole 960 in top thermostat block 902. When the thermostat block 90 is assembled in broiling unit 12, capture screw 96 contacts grill actuator 42 (FIG. 5).

Capture screw 96 can be used to calibrate thermostat block 90. Turning capture screw 96 changes the length capture screw 96 protrudes through hole 960 in top thermostat block 902. This length is proportional to the turn on and turn off temperature of thermostat block 90. For example, to lower the turn off temperature, capture screw 96 would be turned clockwise. Alternately, the adjustable cam (not shown) could be adjusted to alter the location of pin 82 and corresponding hole within grill 13. This adjustment changes the turn-on and turn-off temperature of thermostat block 90 by changing the distance grill 13 would have to expand to cause the grill actuator 42 to contact capture screw 96.

AC electricity is supplied to thermostat block 90 through AC plugs 84. AC plugs 84 are connected to control module 168 (FIG. 1) through the side of grill supporter 26a. These AC plugs 84 include AC plug 842, ground plug 844, and AC plug 846. AC plug 846 is connected through wire 948 to AC contact 102 on microswitch 100.

Embedded in top thermostat block 902 are slits 986, 982 and 984. AC contact 106 on microswitch 100 is connected through wire 946 to an electrical contact (not shown) in slit 986. AC plug 842 is connected through wire 942 to an electrical contact (not shown) in slit 982. Ground plug 844 is connected through wire 944 to an electrical contact (not shown) in slit 984. Connected to an electrical contact in slits 986, 982 and 984 within top thermostat block 902 is AC contact bars 136 and 132 and ground contact bar 134, respectively. One end of electrically resistive heating element 40, i.e. element end 406, is connected to AC control bar 136. The other end of heating element 40, i.e. element end 402, is connected to the other AC control bar 132. Through thermostat block 90, all electricity is supplied to heating element 40. Attached to grill 13 is ground contact bar 134. Ground contact bar 134 grounds the electric potential on grill 13.

Thermostat Operation

Referring to FIGS. 5 and 6, the operation cycle of thermostat 90 works as follows: Control knob 162 (FIG. 1) is turned to the on position. Non-regulated AC electricity is then distributed from control module 168 through thermostat block 90 to heating element 40. Heating element 40 becomes hot and heats grill 13. Grill 13 then becomes hot and expands. As grill 13 expands, the distance between grill actuator 42 and placement pin 82 becomes larger (see FIG. 5). This distance enlargement causes grill actuator 42 to release capture screw 96. Internal to microswitch 100 is a spring (not shown) pushing out button 108. When capture screw 96 is released, button 108 pushes out on pivot arm 120 resulting in pivot arm 120 rotating counter clockwise with respect to pivot 110 (see FIG. 6). The rotation makes the pivot arm 120 release button 108 which disconnects electricity flowing through microswitch 100 from AC contact 102 to AC contact 106. This disconnection further turns off electric current flowing to the heating element 40.

When heating element 40 is turned off, grill 13 cools and contracts. Grill 13 contracting results in the distance between grill actuator 42 and placement pin 82 becoming smaller (see FIG. 5). This distance reduction results in grill actuator 42 engaging capture screw 96 and causing pivot arm 120 to rotate clockwise with respect to pivot 110 (see FIG. 6). Accordingly, pivot arm presses button 108 which activates microswitch 100 thereby allowing electricity to flow through microswitch 100, from AC contact 102 to AC contact 106, enabling heating element 40.

The operation cycle repeats, thereby automatically maintaining the grill at a stable temperature. The operation cycle continues until control knob 162 is turned to the "off" position. At that time, the cycle ceases as control module 168 (FIG. 1) disconnects electricity to thermostat block 90 and heating element 40.

Thermostat 90 provides a more accurate method to regulate temperature of a grill than prior devices. Prior temperature regulation devices use a heating element controller which responds to thermocouples that sense the temperature of the grill surface. Thermocouples sense only a small area of the grill and may give a false temperature reading to the controller if cold food is placed on the grill in the area above the thermocouple. However, thermostat block 90 regulates the temperature of the grill 12 by responding to the temperature rise and fall throughout the entire grill 12 and not just a localized point. Further, the cooking surface is regulated by controlling power to heating element 40 upon grill 13 expansion.

Without temperature regulation, the heating element 40 on initial power-up would be regulated by control knob 162. If a moderate temperature is selected on control knob 162, the grill 13 may heat up slowly, due to the slow warmup time of heating element 40 and grill 13. With thermostat block 90, upon initially energizing heating element 40, grill 13 will be supplied full power. Further, when grill 12 reaches its operating temperature, thermostat block 90 will turn off heating element 40. By applying full power to heating element 40 on initialization, a quicker method of heating the grill 13 is provided.

This concludes the Description of the Preferred Embodiment. A reading of it by those skilled in the art will bring to mind many modifications and alternatives without departing from the spirit and scope of the invention. Accordingly, it is intended that the invention only be limited by the following claims.

What is claimed is:

1. A method of regulating the temperature of a grill for supporting food to be cooked, comprising the steps of:
   providing a grill that expands when heated;
   placing food on said grill;
   applying heat to said grill to cook said food; and
   reducing said heat applied to said grill in response to expansion of said grill.

2. The method recited in claim 1 further comprising the step of increasing said heat applied to said grill in response to contraction of said grill.

3. The method recited in claim 1 further comprising the step of supporting said grill in an elevated horizontal position.

4. The method of heating food, comprising the steps of:
   placing the food on a support means that expands when heated and contracts when cooled;
   supplying heat to said support means to cook said food; and
   decreasing said heat supplied to said support means in response to expansion of said support means and increasing said heat supplied to said support means in response to contraction of said support means.

* * * * *